Patented Dec. 8, 1931

1,835,853

UNITED STATES PATENT OFFICE

FRANK R. ELDRED, OF JERSEY CITY, NEW JERSEY, ASSIGNOR TO REED & CARNRICK, OF JERSEY CITY, NEW JERSEY, A CORPORATION OF NEW JERSEY

PROSTATE HORMONE AND METHOD OF PRODUCING THE SAME

No Drawing.   Application filed November 1, 1927.   Serial No. 230,382.

This invention relates to a medicinal preparation produced from the prostate gland and to a method of producing the same.

It is an object of the invention to provide as an article of manufacture a highly concentrated active principle or hormone of the prostate gland of sufficient purity to be available for the treatment of human beings and of sufficient strength to bring about the desired action within given limits.

Another object of the invention is to provide a concentrated highly purified active principle or hormone of the prostate gland in tablet or liquid form to be administered orally or by injection.

Another object of the invention is to provide as an article of manufacture in liquid or tablet form a purified highly active hormone of the prostate gland which will serve to replace or renew the normal activity of the prostate gland of the human being.

Another object of the invention is to provide a method of extracting and purifying the active principle or hormone of the prostate gland which will secure the desired purity and strength of the hormone at a cost which will place the hormone within the reach of all classes of patients.

Other advantages and objects will appear as the description of the invention proceeds.

I have found that if the prostate gland is removed from immature rats, the animals lose their normal activity and the testicles tend to atrophy, but if the hormone of the prostate gland is administered to these animals, they show a marked improvement in activity and the testicles regain their normal condition. I have also found that the administration of the hormone of the prostate gland either orally or by injection to apparently normal animals causes the general increase in measured activity of these animals and brings about an appearance of greater alertness and vigor and tends to increase sex activity.

In my research and experiments with the production activity and uses of the prostate hormone, I have found that this hormone may be extracted from the prostate gland in a variety of ways by the use of various types of re-agents. I have found generally that the hormone is extracted from the gland by the use of dilute acids and is precipitated when such acid solutions are rendered alkaline and that various acids and alkalies may be used for this purpose, and that they may be used in varying concentrations and the solution in acids and precipitation by the use of alkalies may be repeated as many times as necessary to secure the desired purity of the hormone. It is my belief that I am the first to produce an active hormone of the prostate gland and my invention is therefore not limited to a particular process or method of procedure or to the use of specific re-agents or concentrations thereof. Either freshly minced or desiccated glands may be used. The following detailed description of one of the methods of extraction which I have followed and of the method which I at present prefer will fully illustrate the principles of my invention.

The fresh prostate glands are preferably ground and dried in a vacuum and extracted with petroleum ether to remove as much of the fat and other lipoids as possible from the glands before the extraction of the active principle or hormone is begun. After the extraction with petroleum ether the desiccated glands are then freed from petroleum ether and ground to a coarse powder. To 600 grams of powdered glands I prefer to add 4200 cc. of 5% sulphuric acid. This mixture is allowed to stand for eight to ten hours with frequent stirring, the liquid is then strained off and 1800 cc. of water added to the residue. This mixture is again permitted to stand for several hours with frequent stirring, the liquid strained off and the two liquids combined. The combined liquids are then centrifuged to remove as much as possible of the solid materials and the clear solution is almost neutralized with a concentrated solution of sodium hydroxide. The solution is then made decidedly alkaline to litmus paper by the addition of sodium carbonate, which causes precipitation of the portion containing the active principle or hormone of the prostate gland. The alkaline solution is then centrifuged to separate the precipitate and the liquid is discarded. The precipitate may be washed and dried and pressed into tablets which may contain the prostate hormone alone, or may be combined with the hormone of other glands, such as the testicular hormone, or with phosphorous in organic combination or other drugs to be used for oral administration.

To prepare a more highly purified solution for injection, the precipitate produced above is then shaken thoroughly with 100 cc. of 0.2% sodium carbonate solution and the mixture is again centrifuged and the liquid discarded. The precipitate is now dissolved in 3000 cc. of water containing approximately 15 grams of sodium chloride and 15 cc. of normal hydrochloric acid. This mixture is shaken again for several hours and almost neutralized with normal sodium hydroxide. It is then filtered and adjusted to a pH value of substantially 5.0 and may then be bottled or sealed in ampules after sterilization for administration by injection, or the prostate hormone may be combined with the testicular hormone to permit the simultaneous administration of the two by injection. Further purification can be effected by again precipitating with an alkali and dissolving in dilute acid.

As described at the beginning of this specification, it will be understood that various acids and alkalies may be used other than those specified and that the specific concentrations given for the purpose of illustration may be varied within certain limits without materially affecting the strength or purity of the hormone.

It is my belief that I am the first to produce an active hormone of the prostate gland and I wish to have my invention interpreted broadly within the scope of this specification and the appended claims.

What I claim as my invention is:

1. The method of preparing an active hormone from the prostate gland which comprises extracting the hormone from the glands by means of dilute acid, removing the solid particles from the acid solution, precipitating the hormone from the acid solution by the addition of an alkali, washing the precipitate with a dilute alkali and dissolving in water.

2. The method of preparing an active hormone of the prostate gland which comprises removing fats and other lipoids from the dried glands, extracting the hormone from the glands by means of a dilute acid, removing the solid particles from the acid solution, precipitating the hormone from the acid solution by the addition of a concentrated alkali, washing the precipitate with a dilute alkali and dissolving in water.

3. The method of preparing an active hormone of the prostate gland which comprises grinding and drying the fresh glands, extracting with petroleum ether to remove fats and other lipoids, freeing the glands from the petroleum ether, grinding to a coarse powder, extracting the dried glands with dilute sulphuric acid, removing the solids from the acid solution, almost neutralizing with concentrated sodium hydroxide rendering alkaline by the addition of sodium carbonate to precipitate the hormone and washing the precipitated hormone.

4. The method of preparing an active hormone of the prostate gland which comprises grinding and drying the fresh glands, extracting with petroleum ether to remove fats and other lipoids, freeing the glands from the petroleum ether, grinding to a coarse powder, extracting the dried glands with dilute sulphuric acid, removing the solids from the acid solution, almost neutralizing with concentrated sodium hydroxide rendering alkaline by the addition of sodium carbonate to precipitate the hormone and washing the precipitated hormone, redissolving in a dilute acid, neutralizing the acid solution, separating the solids and preparing for administration by injection.

5. The remedial agent obtained from the prostate glands of animals, which is soluble in acids, insoluble in alkali, free from protein and of such strength that the administration thereof produces a noticeable increase in activity in a prostectomized rat.

In testimony whereof I have affixed my signature to this specification.

FRANK R. ELDRED.